(12) United States Patent
Ang et al.

(10) Patent No.: US 9,694,809 B2
(45) Date of Patent: Jul. 4, 2017

(54) ENGINE STOP DEVICE

(71) Applicant: TOYOTA JIDOSHA KABUSHIKI KAISHA, Toyota-shi, Aichi-ken (JP)

(72) Inventors: Wanleng Ang, Gotemba (JP); Masaki Okamura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 102 days.

(21) Appl. No.: 14/867,369

(22) Filed: Sep. 28, 2015

(65) Prior Publication Data

US 2016/0096523 A1 Apr. 7, 2016

(30) Foreign Application Priority Data

Oct. 2, 2014 (JP) ................. 2014-204246

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/40* | (2016.01) |
| *B60W 10/06* | (2006.01) |
| *B60W 10/08* | (2006.01) |
| *B60K 6/20* | (2007.10) |
| *B60W 20/00* | (2016.01) |
| *B60W 30/192* | (2012.01) |

(52) U.S. Cl.
CPC ............. *B60W 20/40* (2013.01); *B60K 6/20* (2013.01); *B60W 10/06* (2013.01); *B60W 10/08* (2013.01); *B60W 20/00* (2013.01); *B60W 30/192* (2013.01); *Y02T 10/6286* (2013.01); *Y10S 903/903* (2013.01)

(58) Field of Classification Search
CPC .... B60W 20/40; B60W 30/192; B60W 20/00; B60W 10/06; B60W 10/08; B60K 6/20; Y02T 10/6286; Y10S 903/903
USPC ........................................................ 701/1, 22
See application file for complete search history.

(56) References Cited

U.S. PATENT DOCUMENTS

| | | | | |
|---|---|---|---|---|
| 6,561,150 B1 * | 5/2003 | Kikuoka | ................... | F01L 1/08 123/90.16 |
| 7,228,209 B2 * | 6/2007 | Izawa | ................... | B60K 6/445 477/43 |
| 2005/0178594 A1 * | 8/2005 | Yamauchi | .............. | B60K 6/445 180/65.235 |

(Continued)

FOREIGN PATENT DOCUMENTS

| | | |
|---|---|---|
| JP | 2003-518585 A | 6/2003 |
| JP | 2008-180132 A | 8/2008 |

*Primary Examiner* — Jaime Figueroa
(74) *Attorney, Agent, or Firm* — Sughrue Mion, PLLC (57) ABSTRACT

An engine stop device includes: a detection part that detects a difference between a current position of a crankshaft and a target stop position of the crankshaft; and a control part that controls a motor based on the detected difference so that the crankshaft is able to approach the target stop position when an engine is stopped or after the engine is stopped. The control part selects one of a plurality of maps that define a relationship between a moving distance and a rotational speed based on the detected difference, and controls the motor based on the selected map.

5 Claims, 7 Drawing Sheets

(56) References Cited

U.S. PATENT DOCUMENTS

| | | | | |
|---|---|---|---|---|
| 2007/0232444 A1* | 10/2007 | Adachi | ............... | F02D 41/009 477/74 |
| 2008/0083390 A1* | 4/2008 | Nishikiori | ............ | F02D 41/042 123/179.4 |
| 2010/0036590 A1* | 2/2010 | Nakai | ............... | F02D 41/042 701/112 |
| 2010/0204908 A1* | 8/2010 | Nakai | ............... | B60W 10/06 701/112 |
| 2013/0274978 A1* | 10/2013 | Lemp | ............... | B60W 20/40 701/22 |
| 2014/0074333 A1* | 3/2014 | Ohkuma | ............ | B60K 6/445 701/22 |

\* cited by examiner

FIG. 8

ENGINE STOP DEVICE

INCORPORATION BY REFERENCE

The disclosure of Japanese Patent Application No. 2014-204246 filed on Oct. 2, 2014 including the specification, drawings and abstract is incorporated herein by reference in its entirety.

BACKGROUND OF THE INVENTION

1. Field of the Invention

The invention relates to an engine stop device that stops an engine that is mounted on an automobile, for example, and, more particularly, to a technical field of an engine stop device that controls a stop position of the crankshaft of the engine.

2. Description of Related Art

As a device of this type, a device has been proposed that uses a motor, for example, to correct the stop position of the crankshaft when the stop position of the crankshaft is displaced from a desired position after the engine stop in an inertial rotation stopping phase, for example (refer to Published Japanese Translation of PCT application No. 2003-518585(JP 2003-518585 A)).

A device has been also proposed that sets a torque command to control a motor by correcting base torque that is output from a motor with correction torques that are based on the travel distance and oil viscosity, respectively, in order to stop the crankshaft of the engine at a predetermined stop position when conditions for an automatic stop of the engine are fulfilled (refer to Japanese Patent Application Publication No. 2008-180132 (JP 2008-180132 A)).

However, the above related arts still have a technical problem, in other words, still have room for improvement.

SUMMARY OF THE INVENTION

The invention provides an engine stop device that can stop a crankshaft at a target stop position quickly with high accuracy.

An engine stop device according to an aspect of the invention is mounted on a vehicle that is equipped with an engine and a motor that is able to output torque to a crankshaft of the engine, and includes: a detection part that detects a difference between a current position of the crankshaft and a target stop position of the crankshaft; and a control part that controls the motor based on the detected difference so that the crankshaft is able to approach the target stop position when the engine is stopped or after the engine is stopped. The control part selects one of a plurality of maps that define a relationship between a moving distance which is a value that relates to a rotational angle of the crankshaft and a rotational speed of the crankshaft based on the detected difference, and controls the motor based on the selected map.

According to the above aspect, the engine stop device is mounted on a vehicle that is equipped with an engine, and a motor that can output torque to a crankshaft of the engine. Here, the "motor" may be a starter motor or a motor that is implemented by a motor generator (electric motor generator). In other words, the motor may be a motor generator that is used in a hybrid vehicle, for example, as long as it can function as a motor.

The detection part, which includes a memory, a processor and so on, for example, detects the difference between a current position of the crankshaft and a target stop position of the crankshaft. Here, the "difference between a current position and a target stop position" means, for example, the angular difference between the current angle of the crankshaft and the angle of the crankshaft corresponding to the target stop position, the rotational speed corresponding to the angular difference (such as a value that is obtained by dividing the angular difference by 360 degrees), or a value that is obtained by adding an angle corresponding to the rotational speed necessary for deceleration to the angular difference.

The control part, which includes a memory, a processor and so on, for example, controls the motor based on the difference that is detected by the detection part so that the crankshaft can stop at a target stop position when the engine is stopped or after the engine is stopped. The expression "when the engine is stopped" is a concept that is not limited to the moment when the rotation of the crankshaft stops but includes the period from when a signal that commands an engine stop is output to when the rotation of the crankshaft stops, in other words, the period for which engine stop processing is executed, for example. The expression "after the engine is stopped" means the period until a signal that commands an engine start (or restart) is output after the moment when the rotation of the crankshaft stops, for example.

In the above aspect in particular, the control part selects one of a plurality of maps that define the relationship between a moving distance which is a value that relates to a rotational angle of the crankshaft and a rotational speed of the crankshaft based on the difference that is detected by the detection part, and controls the motor based on the selected map. The expression "a moving distance which is a value that relates to a rotational angle of the crankshaft" means an integrated value or the total amount of change in the rotational speed of the crankshaft after the start of the processing to stop the crankshaft at a target stop position.

According to studies by the inventors of this application, the following facts have been found. Each map has a control resolution. For example, when the control resolution is relatively high, the crankshaft can be stopped at a target stop position with a relatively high accuracy. On the other hand, when the control resolution is relatively high, the processing takes a relatively long time, making it difficult to stop the crankshaft at a target stop position quickly.

Thus, in the invention, one map is selected from a plurality of maps with different control resolutions, for example, based on the difference that is detected by the detection part (in other words, the difference between the current position and target stop position of the crankshaft), and the motor is controlled based on the selected map by the control part. Specifically, when a map with a relatively low control resolution is selected when the difference between the current position and target stop position of the crankshaft is relatively large, for example, the current position of the crankshaft can be moved toward the target stop position relatively quickly. Then, when a map with a relatively high control resolution is selected when the difference between the current position and target stop position of the crankshaft is relatively small, the crankshaft can be stopped at the target stop position with high accuracy.

According to the above aspect, because a map is selected based on the difference between the current position and target stop position of the crankshaft, the crankshaft can be stopped at the target stop position relatively quickly with high accuracy.

In the above aspect, the control part may select, from the plurality of maps, a correction map when the detected difference is smaller than a threshold value, the correction map being a map in which the relationship between the moving distance and the rotational speed is defined with a higher resolution than in a first map that is selected when the detected difference is equal to or greater than the threshold value.

In the above configuration, the correction map, which is a map that is set to have a relatively high resolution, is selected when the difference that is detected by the detection part is smaller than a threshold value. When the motor is controlled based on the selected correction map, the position of the crankshaft can be finely adjusted relatively easily.

Here, the "threshold value" is a value that is used to determine whether to select the correction map, and is set in advance as a fixed value or a value variable depending on a physical quantity or parameter of some sort. Such a threshold value can be set based on the relationship between the difference between the current position and target stop position of the crankshaft and the time it takes to stop the crankshaft at the target stop position when control with a relatively high accuracy is performed that is obtained experimentally or empirically or by simulation, and an allowable processing time, for example.

In the above configuration, the rotational speed may be regarded as zero in the correction map when the moving distance has a value within a predetermined range that includes the target stop position.

With this configuration, the load of processing to stop the crankshaft at a target stop position can be reduced, and the crankshaft can be stopped at a target stop position relatively quickly. Here, the "predetermined range" can be set to such a range that the difference between the stop position and target stop position of the crankshaft is an allowable value for practical use, for example.

In the above configuration, the correction map may have an upper limit for the rotational speed that is lower than that in the first map.

According to studies by the inventors of this application, the following facts have been found. When a motor is used to stop the crankshaft at a target stop position, there is a possibility that the crankshaft is displaced from the target stop position by the air pressure in a cylinder that is on its compression stroke after the crankshaft is stopped, for example. One possible way to prevent the displacement is to cause the motor to continue to output torque comparable to the air pressure in the cylinder that is on its compression stroke, for example. However, this may lead to a decrease in fuel efficiency because electric power must continue to be supplied to the motor.

When the above correction map is used, the crankshaft is rotated by the motor relatively slowly in the vicinity of the target stop position. Thus, the air pressure in the cylinder that is on its compression stroke can be reduced while the crankshaft is stopped at the target stop position, for example. Thus, the crankshaft can be prevented from being rotated by the air pressure in a cylinder after the crankshaft is stopped. In addition, because there is no need to continue to supply electric power to the motor to prevent the crankshaft from rotating, the fuel efficiency can be improved. This is very advantageous for practical use.

In the above configuration, when a stop position of the crankshaft is displaced from the target stop position after the engine is stopped, the control part may select, as the first map, a map in which the rotational speed once increases and such a direction as to rotate the crankshaft positively and then decreases as the current position of the crankshaft approaches the target stop position, and select, as the correction map, a map in which the rotational speed in such a direction as to rotate the crankshaft positively decreases as the current position of the crankshaft approaches the target stop position from such a direction that the moving distance increases and the rotational speed in such a direction as to rotate the crankshaft negatively decreases as the current position of the crankshaft approaches the target stop position from such a direction that the moving distance decreases.

With this configuration, when the stop position of the crankshaft is displaced from the target stop position by, for example, an external disturbance after the engine is stopped, the crankshaft can be corrected to the target stop position relatively quickly with high accuracy without increasing the load on dynamic power transmission members such as gears.

Effects and other advantages of the invention will be apparent from the embodiment that is described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of an engine stop device of the invention is described based on the drawings.

Figure 1:
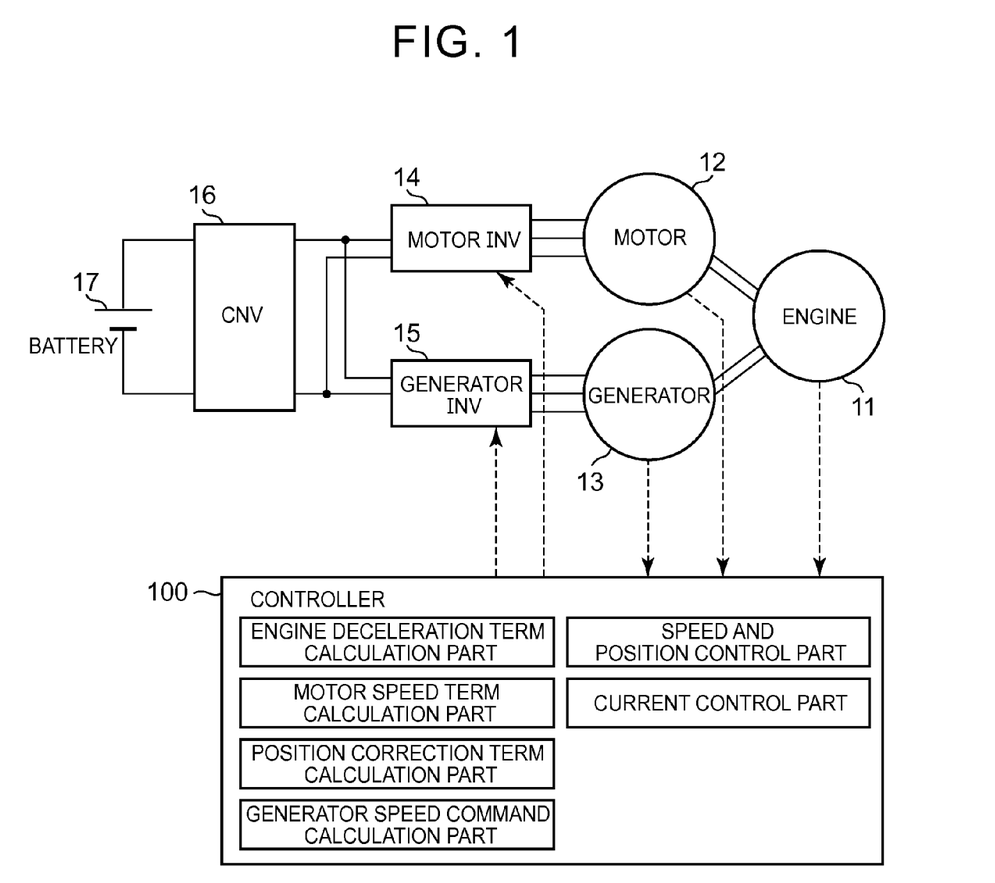
FIG. 1 is a configuration diagram that illustrates an essential part of a vehicle according to an embodiment.

The configuration of a vehicle that is equipped with an engine stop device according to the embodiment is described with reference to FIG. 1. FIG. 1 is a configuration diagram that illustrates an essential part of a vehicle according to the embodiment.

As shown in FIG. 1, the vehicle according to the embodiment includes an engine 11, a motor 12 and a generator 13. The engine 11, the motor 12 and the generator 13 are connected to each other via a power split mechanism (not shown). Each of the motor 12 and the generator 13 may be implemented by a motor generator.

The power split mechanism is constituted as a single-pinion planetary gear unit that has a sun gear, a ring gear and a carrier as rotational elements that are differentially rotatable relative to each other, for example. The crankshaft of the engine 11 is connected to the carrier via an input shaft of the power split mechanism. The rotating shaft of the generator 13 is connected to the sun gear, and the sun gear and the rotating shaft rotate together. The rotating shaft of the motor 12 is connected to the ring gear via the output shaft of the power split mechanism.

The power split mechanism has a gear ratio "ρ." In other words, when the interval between the sun gear and the carrier is defined as "1," the interval between the carrier and the ring gear corresponds to the gear ratio "ρ."

The motor 12 is electrically connected to a battery 17 via a motor inverter 14 and a converter 16. The generator 13 is electrically connected to the battery 17 via a generator inverter 15 and the converter 16.

A controller 100 as an engine stop device acquires information on the angle or rotational speed of the crankshaft of the engine 11, for example, based on outputs from various sensors that are provided in the engine 11, the motor 12 and the generator 13. Based on the acquired information, the controller 100 separately controls the motor inverter 14 and the generator inverter 15 by a PWM (Pulse Width Modulation) control method, for example, so that the rotational speed or torque of each of the motor 12 and the generator 13 can reach a target value.

Figure 2:
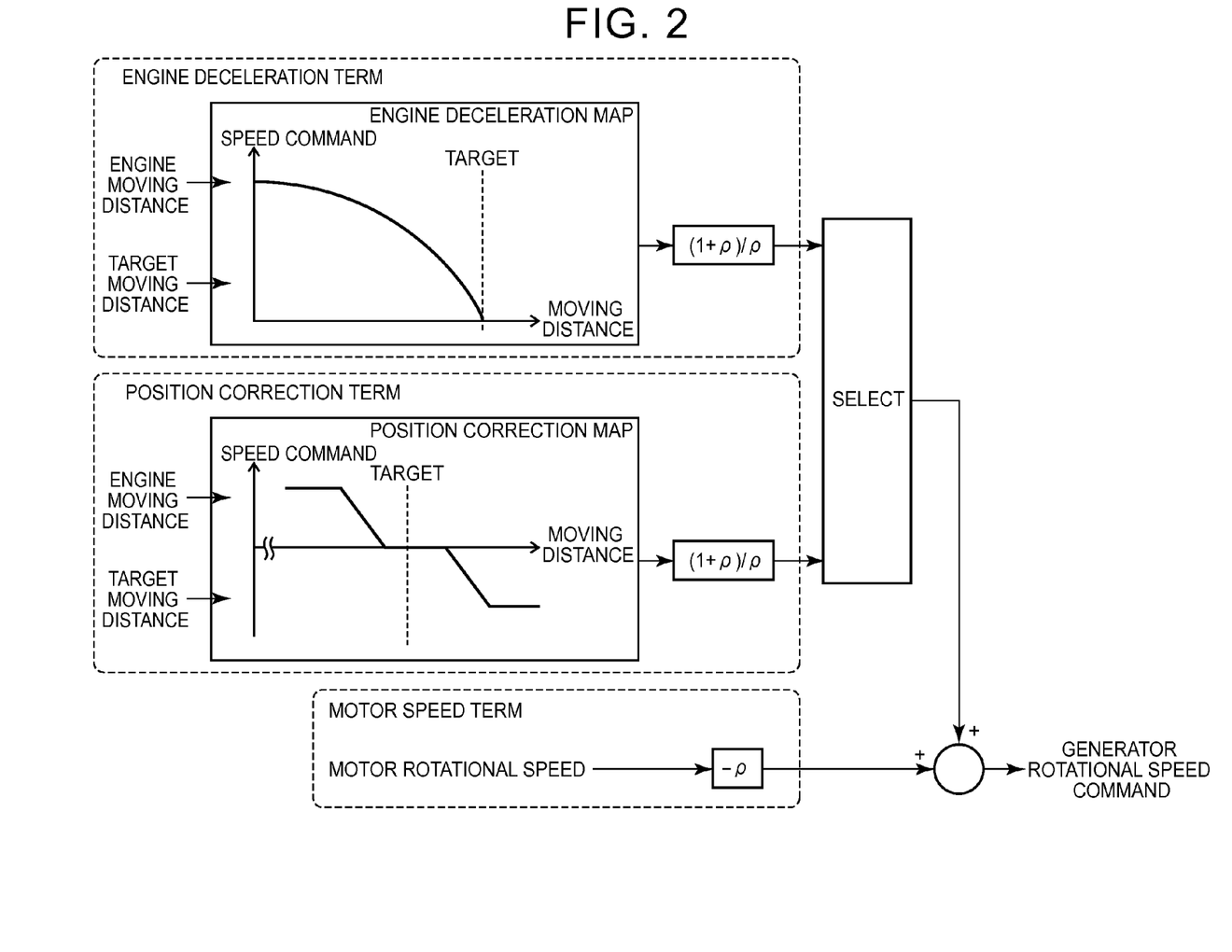
FIG. 2 is a conceptual diagram that illustrates the concept of engine stop processing according to the embodiment.
Figure 3:
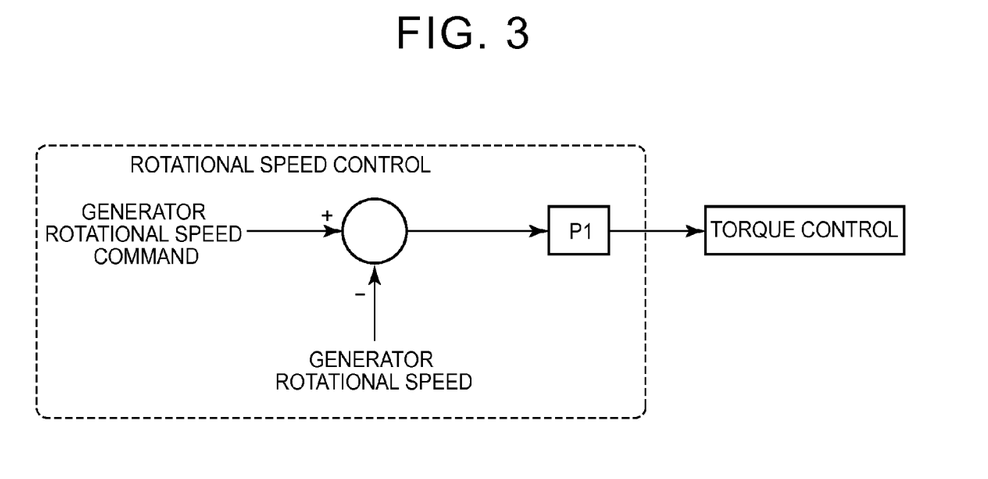
FIG. 3 is a conceptual diagram that illustrates the concept of torque control processing according to the embodiment.

Engine stop control processing that the controller 100 executes in a vehicle that is constituted as described above is next described with reference to FIG. 2 and FIG. 3. FIG. 2 is a conceptual diagram that illustrates the concept of engine stop processing according to the embodiment. FIG. 3 is a conceptual diagram that illustrates the concept of torque control processing according to the embodiment.

When conditions for an automatic stop of the engine 11 are fulfilled, the controller 100 separately controls the engine 11 and the generator 13 so that the crankshaft of the engine 11 can stop at a predetermined stop position.

The controller 100 obtains the moving distance of the engine 11 after the fulfillment of conditions for an automatic stop of the engine 11 (for example, after setting of an engine automatic stop flag) based on an output signal from a crank position sensor that detects the rotational position of the crankshaft of the engine 11, for example.

The moving distance of the engine 11 is represented as an integrated value of the rotational speed of the crankshaft (in other words, integrated rotational speed) or the total amount of change in the rotational speed of the crankshaft after the fulfillment of conditions for an automatic stop of the engine 11. Specifically, the moving distance of the engine 11 may be represented as a product of the integrated rotational speed of the crankshaft after the fulfillment of conditions for an automatic stop of the engine 11 and 360 degrees, for example.

The controller 100 obtains a target moving distance which is the difference between the current position and target stop position of the crankshaft based on an output signal from the crank position sensor, for example. The target moving distance may be represented as the sum of the angular difference between the current position and target stop position of the crankshaft and the product of an integrated rotational speed of the crankshaft necessary for deceleration and 360 degrees, for example. With this configuration, the shock resulting from an automatic stop of the engine 11 can be reduced. This is very advantageous for practical use.

The controller 100 selects one of a plurality of maps that are stored in advance in a memory or the like of the controller 100 and define the relationship between the moving distance of the engine 11 and a speed command of the engine 11. In the processing in FIG. 2, either an "engine deceleration map" or a "position correction map" is selected. The "speed command of the engine" refers to the "engine speed of the engine (rotational speed of the crankshaft) (rpm: revolution per minute)," for example.

Here, the position correction map is set to have a higher resolution than the engine deceleration map. Specifically, the moving distance (horizontal axis) of the position correction map is set in increments of one degree and the moving distance of the engine deceleration map is set in increments of 50 degrees, for example. In addition, the upper limit for the speed command of the position correction map is set lower than that for the speed command of the engine deceleration map.

When the engine speed of the engine 11 is relatively high, the controller 100 specifies a speed command of the engine 11 based on the moving distance and the target moving distance of the engine 11 and the engine deceleration map.

The controller 100 obtains the rotational speed of the motor 12 based on an output signal from, for example, a rotational position detection sensor that detects the rotational position of the rotor of the motor 12 or a current sensor that detects the phase current that is being applied to the motor 12.

Then, the controller 100 obtains a rotational speed command of the generator 13 from a value that is obtained by multiplying the specified speed command of the engine 11 by a gear ratio (here, "(1+ρ)/ρ") and a value that is obtained by multiplying the obtained rotational speed of the motor 12 by a gear ratio (here, "−ρ").

Then, the controller 100 obtains the rotational speed of the generator 13 based on an output signal from, for example, a rotational position detection sensor that detects the rotational position of the rotor of the generator 13 or a current sensor that detects the phase current that is being applied to the generator 13 (refer to FIG. 3).

The controller 100 performs torque control of the generator 13 by, for example, PI (Proportional-Integral) control based on the obtained rotational speed command of the generator 13 and the actual rotational speed of the generator 13 (refer to FIG. 3). As a result, torque in such a direction as to suppress the rotation of (in other words, decelerate) the engine 11 is output from the generator 13.

When the engine speed of the engine 11 falls to or below a predetermined engine speed or the target moving distance falls to or below a predetermined distance as a result of the above control processing, the controller 100 selects the position correction map in place of the engine deceleration map (refer to FIG. 2). Here, the "predetermined engine speed" and the "predetermined distance" are respectively set to such an engine speed and a distance that the crankshaft stops while it rotates approximately one revolution, for example (when the distance is expressed in angle, it is approximately 360 degrees for example).

The controller 100 specifies a speed command of the engine 11 based on the moving distance and the target moving distance of the engine 11 and the position correction map. Then, the controller 100 obtains a rotational speed command of the generator 13 based on the specified speed command of the engine 11 and the rotational speed of the motor 12, and performs torque control of the generator 13 based on the obtained rotational speed command of the generator 13.

Here, in this embodiment in particular, the value of the engine speed command in the vicinity of the target stop position (refer to "target" in FIG. 2) in the position correction map is set to zero. With this configuration, it is possible to prevent output of unnecessary torque from the generator 13 or execution of unnecessary processing in the controller 100 that results from an error of a sensor, for example. It should be noted that the range in which the value of the engine speed command is zero in the position correction map can be set so that the difference between the stop position and the target stop position of the crankshaft can be within an allowable range.

Figure 8:
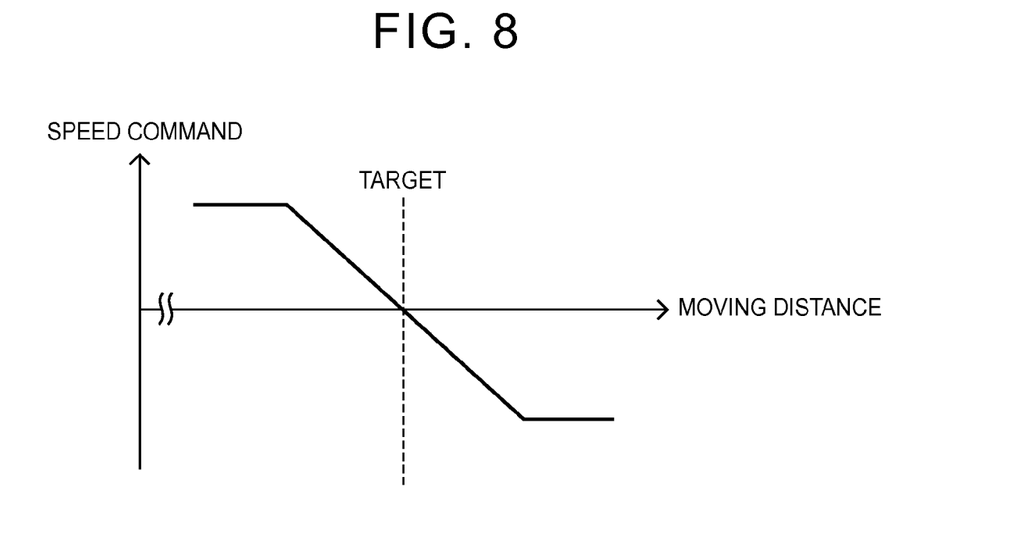
FIG. 8 is a diagram that illustrates a modification of a position correction map according to the embodiment.

It should be noted that a map that is shown in FIG. 8, for example, may be used as the position correction map in place of the position correction map that is shown in FIG. 2. FIG. 8 is a diagram that illustrates a modification of the position correction map according to the embodiment.

Engine stop processing that the controller 100 executes is further described with reference to the flowchart in FIG. 4.

Figure 4:
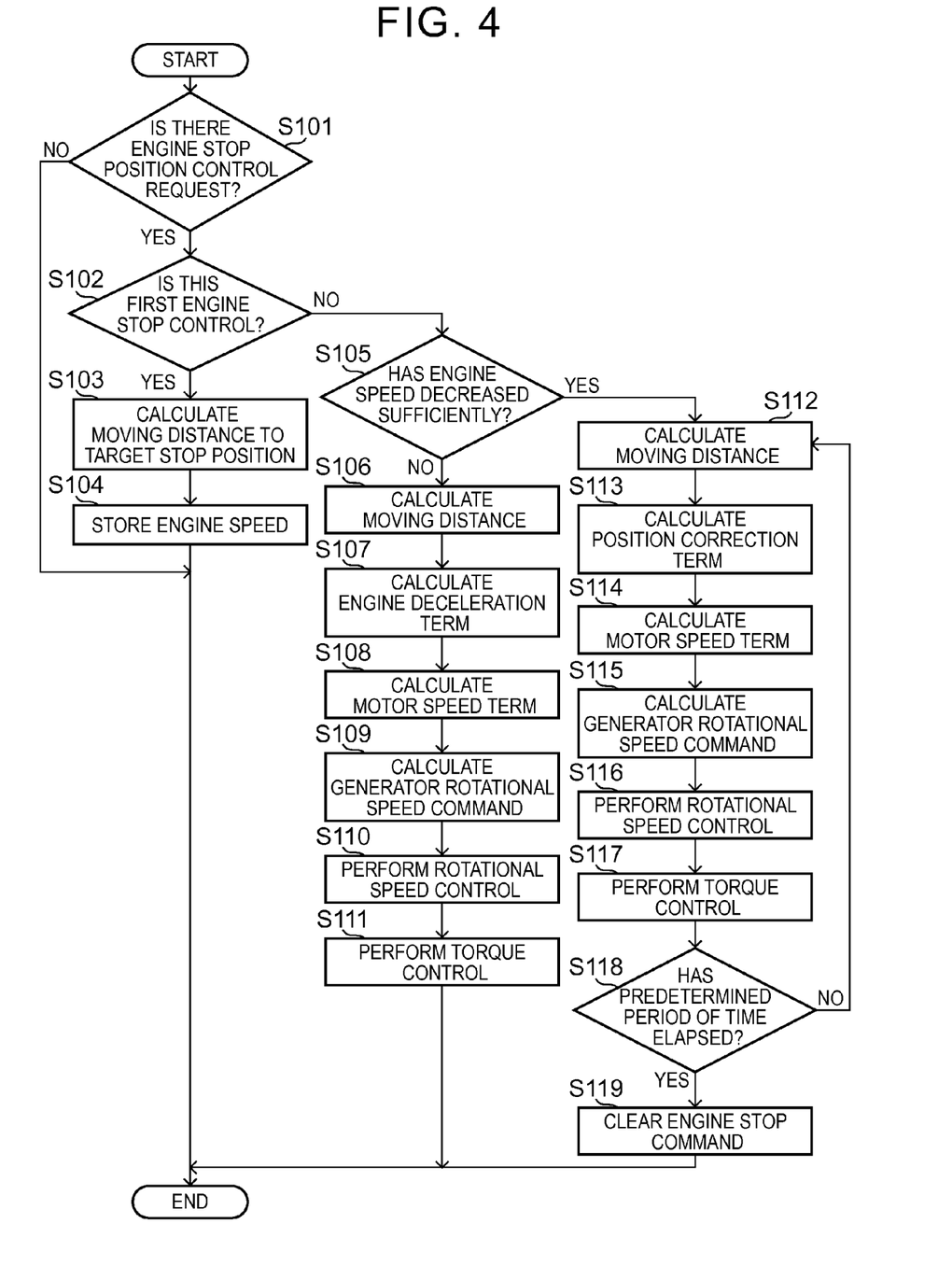
FIG. 4 is a flowchart that illustrates the engine stop processing according to the embodiment.

As shown in FIG. 4, the controller 100 first determines whether there is an engine stop position control request (for example, whether an engine automatic stop flag has been set) (step S101). If it is determined that there is no engine stop position control request (step S101: No), the controller 100 terminates the current processing and executes the processing in step S101 again after a lapse of a predetermined period of time (in other words, puts itself into a standby state).

If it is determined that there is an engine stop position control request (step S101: Yes), the controller 100 determines whether this is the first loop of the engine stop control processing (in other words, whether this is the first loop after the setting of the engine automatic stop flag) (step S102).

If it is determined that this is the first loop (step S102: Yes), the controller 100 calculates the moving distance to the target stop position (which corresponds to the initial value of the "target moving distance" in FIG. 2) (step S103). In parallel with the processing in step S103, the controller 100 stores the current engine speed of the engine 11 (step S104). It should be noted that the controller 100 performs predetermined fuel cutoff processing to shut off the supply of fuel to the engine 11 in parallel with the processing in steps S102 to S104.

If it is determined in the processing in step S102 that this is not the first loop (step S102: No), the controller 100 determines whether the engine speed of the engine 11 is equal to or lower than a predetermined engine speed or whether the target moving distance is equal to or smaller than a predetermined distance (step S105).

If it determined that the engine speed of the engine 11 is not equal to or lower than the predetermined engine speed or the target moving distance is not equal to or smaller than the predetermined distance, in other words, if the engine speed of the engine 11 is relatively high (step S105: No), the controller 100 calculates the moving distance of the crankshaft of the engine 11 (which corresponds to the "engine moving distance" in FIG. 2) (step S106).

Then, the controller 100 selects the engine deceleration map, and obtains an engine deceleration term (refer to the "engine deceleration term" in FIG. 2) based on the selected engine deceleration map, the moving distance and the target moving distance of the engine, and the gear ratio of the power split mechanism (step S107). In parallel with the processing in step S107, the controller 100 obtains a motor speed term based on the rotational speed of the motor 12 and the gear ratio of the power split mechanism (refer to "motor speed term" in FIG. 2) (step S108).

Then, the controller 100 obtains a rotational speed command of the generator 13 based on the obtained engine deceleration term and motor speed term (step S109). Then, the controller 100 obtains the rotational speed of the generator 13, and performs rotational speed control (step S110) and torque control (step S111) of the generator 13 based on the obtained actual rotational speed of the generator 13 and the rotational speed command of the generator 13. Then, the controller 100 terminates the current processing, and executes the processing in step S101 after a lapse of a predetermined period of time.

If it is determined in the processing in step S105 that the engine speed of the engine 11 is equal to or lower than the predetermined engine speed or the target moving distance is equal to or smaller than the predetermined distance, in other words, if the engine speed of the engine 11 is relatively sufficiently low (step S105: Yes), the controller 100 calculates the moving distance of the crankshaft of the engine 11 (step S112).

Then, the controller 100 selects the position correction map, and obtains a position correction term (refer to "position correction term" in FIG. 2) based on the selected position correction map, the moving distance and the target moving distance of the engine, and the gear ratio of the power split mechanism (step S113). In parallel with the processing in step S113, the controller 100 obtains a motor speed term based on the rotational speed of the motor 12 and the gear ratio of the power split mechanism (step S114).

Then, the controller 100 obtains a rotational speed command of the generator 13 based on the obtained position correction term and motor speed term (step S115). Then, the controller 100 obtains the rotational speed of the generator 13, and performs rotational speed control (step S116) and torque control (step S117) of the generator 13 based on the obtained actual rotational speed of the generator 13 and the rotational speed command of the generator 13.

Then, the controller 100 determines whether a predetermined period of time has elapsed (step S118). Here, the starting time of the predetermined period of time is when the processing in step S118 is executed for the first time after the setting of the engine automatic stop flag, for example.

If it is determined that the predetermined period of time has not elapsed (step S118: No), the controller 100 counts up a timer, for example, before executing the processing in step S112. The controller 100 may determine whether the predetermined period of time has elapsed based on the value of the timer.

On the other hand, if it is determined that the predetermined period of time has elapsed (step S118: Yes), the controller 100 clears the engine stop command and clears the engine automatic stop flag based on the premise that the crankshaft of the engine 11 has stopped at a target stop position (step S119).

When the crankshaft of the engine is simply stopped at a target stop position, there is a possibility that the crankshaft is displaced from the target stop position after the stop processing by the air pressure in a cylinder of the engine that is on its compression stroke.

Thus, in this embodiment, after the engine speed of the engine 11 sufficiently decreases (in other words, after "Yes" is determined in the processing in step S105), a certain amount of time is spent in evacuating the compressed air in the cylinder that is on its compression stroke to finely adjust the displacement of the crankshaft that is caused by the compressed air. In other words, in this embodiment, displacement of the crankshaft that is caused by the air pressure in the cylinder that is on its compression stroke is prevented by waiting for a predetermined period of time to elapse (refer to step S118).

In addition, after the engine 11 is stopped, there is no need for the generator 13 to continue to output torque to maintain the stop position of the crankshaft because the air pressure in the cylinder that is on its compression stroke is relatively too low to displace the crankshaft. Thus, fuel efficiency can be also improved. This is very advantageous for practical use.

The "predetermined period of time" according to this embodiment can be set by, for example, obtaining the change with time in the air pressure in the cylinder that is on its compression stroke experimentally or empirically or by simulation and determining the period necessary for the air pressure to decrease to a level that is too low to displace the crankshaft or a period that is longer than the period by a predetermined value based on the obtained change with time.

In this embodiment in particular, the engine deceleration map, which has a relatively low resolution and a relatively high upper limit for the engine speed command, is selected until the engine speed of the engine 11 decreases sufficiently, and the position correction map, which has a relatively high resolution and a relatively low upper limit for the engine speed command, is selected after the engine speed of the engine 11 has decreased sufficiently. Thus, after the position of the crankshaft is brought to the vicinity of the target stop position relatively quickly, the position of the crankshaft is finely adjusted at a relatively low rotational speed. As a result, according to this embodiment, the crankshaft can be stopped at a target stop position relatively quickly with high accuracy.

Figure 5:
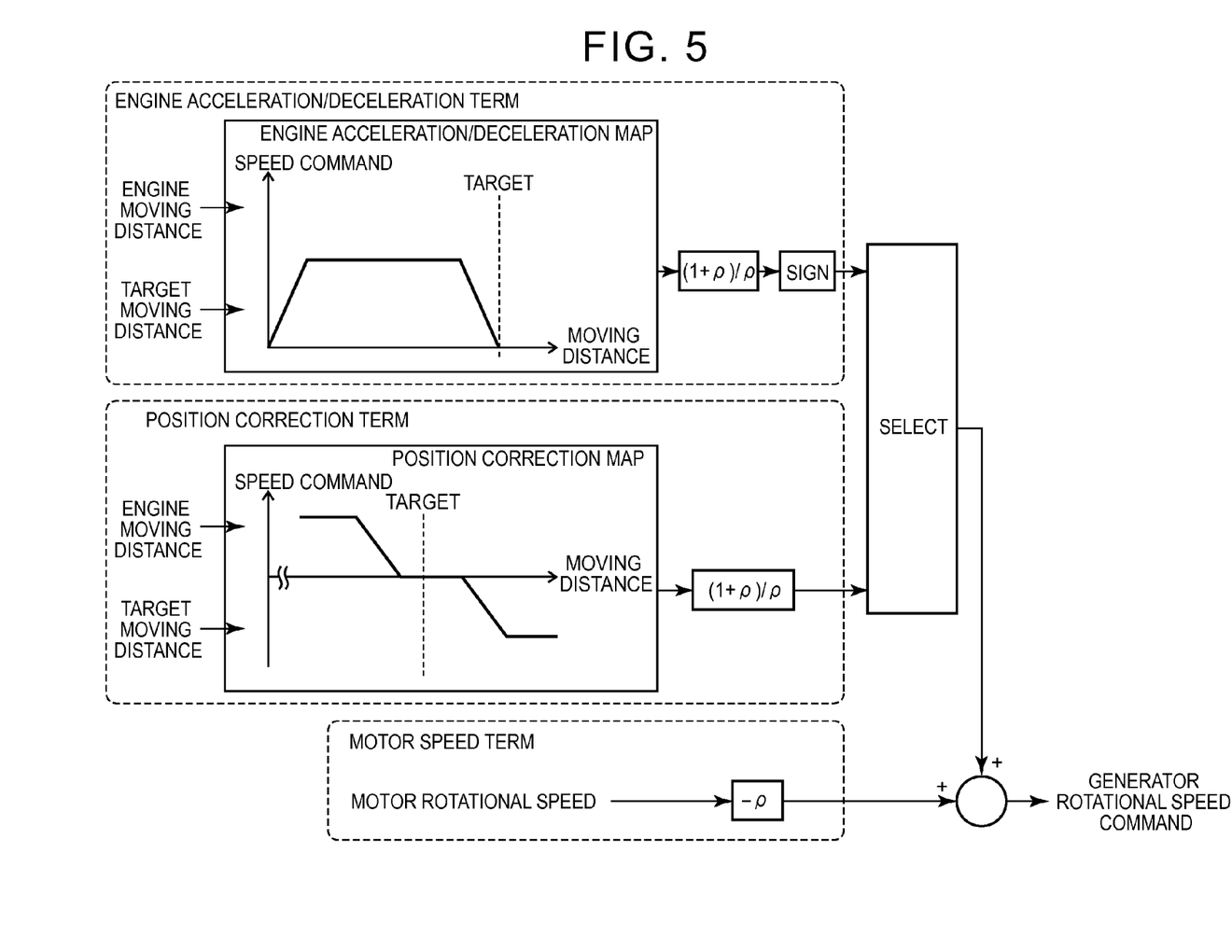
FIG. 5 is a conceptual diagram that illustrates the concept of engine stop position correction processing according to the embodiment.

Engine stop position correction processing that the controller 100 executes when the crankshaft is displaced from the target stop position after the engine 11 is stopped is next described with reference to FIG. 5. FIG. 5 is a conceptual diagram that illustrates the concept of engine stop position correction processing according to the embodiment.

In this embodiment, when the engine 11 is stopped, the air pressure in the cylinder that is on its compression stroke is reduced as described above. In this embodiment, the stop position of the crankshaft of the engine 11 is not maintained using the generator 13, for example. Thus, there is a possibility that the crankshaft is displaced from the target stop position by an external disturbance such as acceleration or deceleration of the vehicle.

Thus, the controller 100 is configured to monitor output signals from the crank position sensor sequentially, for example, so that it can detect that the crankshaft is displaced from the target stop position.

When the position of the crankshaft is displaced from the target stop position beyond an allowable range, an engine stop position correction flag is set, for example. The controller 100 obtains the moving distance of the engine 11 after the setting of the engine stop position correction flag based on, for example, an output signal from the crank position sensor. In addition, the controller 100 obtains the moving distance necessary to correct the crankshaft from the current position to the target stop position (which corresponds to the "engine target moving distance" in FIG. 5) based on, for example, an output signal from the crank position sensor.

The controller 100 selects one of a plurality of maps that are stored in advance in a memory or the like of the controller 100 and define the relationship between the moving distance of the engine 11 and a speed command of the engine 11. In the processing in FIG. 5, either an "engine acceleration/deceleration map" or a "position correction map" is selected.

Here, the position correction map is set to have a higher resolution than the engine acceleration/deceleration map. In addition, the upper limit for the speed command of the position correction map is set lower than that for the speed command of the engine acceleration/deceleration map.

When the current position and the target stop position of the crankshaft are relatively far apart from each other, the controller 100 specifies a speed command of the engine 11 based on the moving distance and the target moving distance of the engine 11 and the engine acceleration/deceleration map.

The controller 100 obtains the rotational speed of the motor 12 based on an output signal from, for example, a rotational position detection sensor that detects the rotational position of the rotor of the motor 12 or a current sensor that detects the phase current that is being applied to the motor 12.

Then, the controller 100 obtains a rotational speed command of the generator 13 from a value that is obtained by multiplying the specified speed command of the engine 11 by a gear ratio (here, "$(1+\rho)/\rho$") and adding a sign corresponding to the direction of rotation of the crankshaft (in other words, "+" or "−") and a value that is obtained by multiplying the obtained rotational speed of the motor 12 by a gear ratio (here, "$-\rho$").

Then, the controller 100 obtains the rotational speed of the generator 13 based on an output signal from, for example, a rotational position detection sensor that detects the rotational position of the rotor of the generator 13 or a current sensor that detects the phase current that is being applied to the generator 13 (refer to FIG. 3).

The controller 100 performs torque control of the generator 13 by, for example, PI control based on the obtained rotational speed command of the generator 13 and the actual rotational speed of the generator 13 (refer to FIG. 3). As a result, torque in such a direction as to move the crankshaft toward the target stop position is output from the generator 13.

When the difference between the current position and target stop position of the crankshaft (in other words, the target moving distance) falls to or below a predetermined distance (several to several to a dozen degrees, for example) as a result of the above control processing, the controller 100 selects the position correction map in place of the engine acceleration/deceleration map.

The controller 100 specifies a speed command of the engine 11 based on the moving distance and the target moving distance of the engine 11 and the position correction map. Then, the controller 100 obtains a rotational speed command of the generator 13 based on the specified speed command of the engine 11 and the rotational speed of the motor 12, and performs torque control of the generator 13 based on the obtained rotational speed command of the generator 13.

The engine stop position correction processing that the controller 100 executes is further described with reference to the flowchart in FIG. 6.

Figure 6:
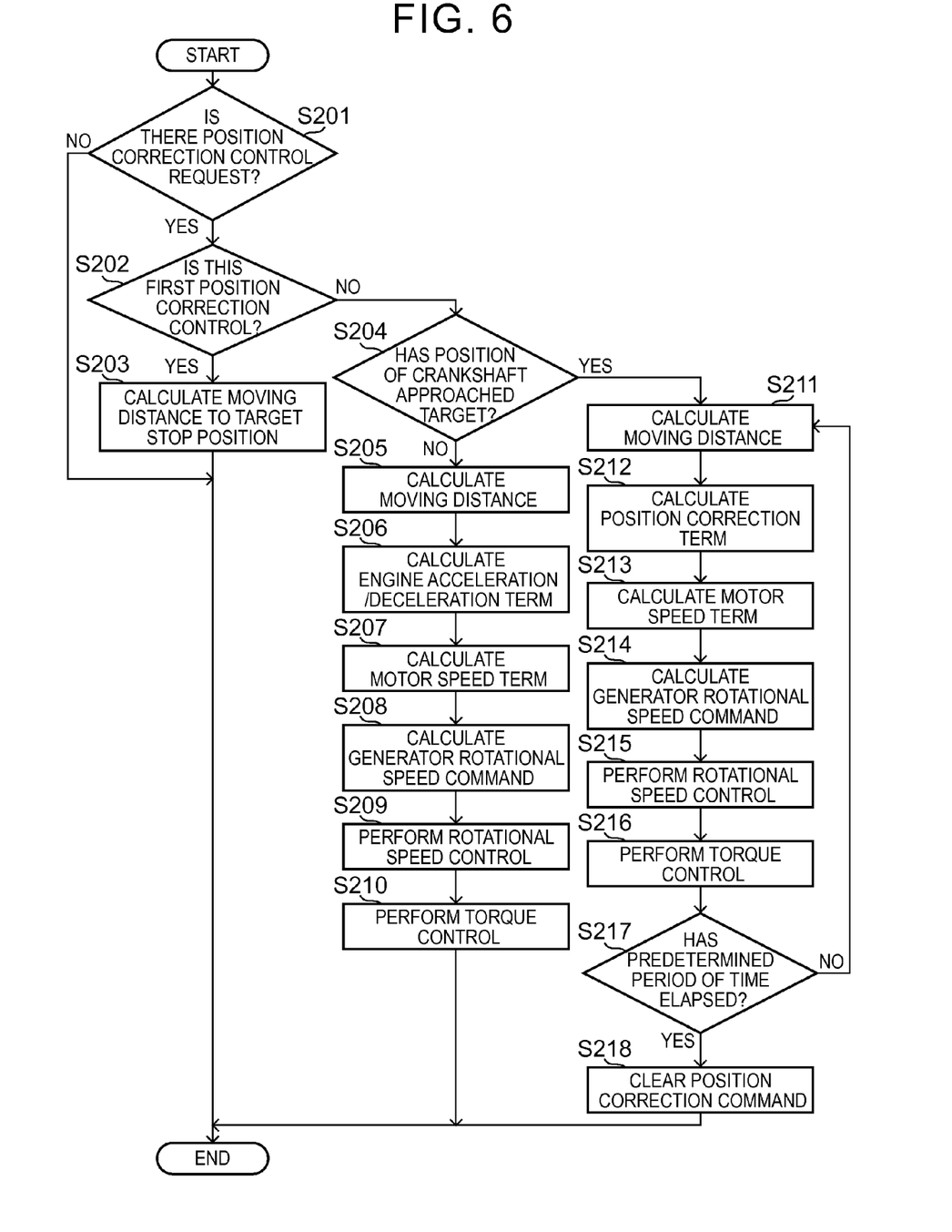
FIG. 6 is a flowchart that illustrates the engine stop position correction processing according to the embodiment.

As shown in FIG. 6, the controller 100 first determines whether there is an engine stop position correction control request (for example, whether an engine stop position correction flag has been set) (step S201). If it is determined that there is no engine stop position correction control request (step S201: No), the controller 100 terminates the current processing and executes the processing in step S201 again after a lapse of a predetermined period of time (in other words, puts itself into a standby state).

If it is determined that there is an engine stop position correction control request (step S201: Yes), the controller 100 determines whether this is the first loop of the engine stop position correction processing (in other words, whether this is the first loop after the setting of the engine stop position correction flag) (step S202).

If it is determined that this is the first loop (step S202: Yes), the controller 100 calculates the moving distance to the target stop position (which corresponds to the initial value of the "target moving distance" in FIG. 5) (step S203).

If it is determined that this is not the first loop in the processing in step S202 (step S202: No), the controller 100 determines whether the target moving distance of the engine 11 is equal to or smaller than a predetermined distance (step S204).

If it is determined that the target moving distance of the engine 11 is not equal to or smaller than the predetermined distance, in other words, the current position of the crankshaft is relatively far apart from the target stop position (step S204: No), the controller 100 calculates the moving distance of the crankshaft of the engine 11 (which corresponds to the "engine moving distance" in FIG. 5) (step S205).

Then, the controller 100 selects the engine acceleration/deceleration map, and obtains an engine acceleration/deceleration term based on the selected engine acceleration/deceleration map, the moving distance and the target moving distance of the engine, the gear ratio of the power split mechanism, and the direction of rotation of the crankshaft (refer to "engine acceleration/deceleration term" in FIG. 5) (step S206). In parallel with the processing in step S206, the controller 100 obtains a motor speed term based on the rotational speed of the motor 12 and the gear ratio of the power split mechanism (refer to "motor speed term" in FIG. 5) (step S207).

Then, the controller 100 obtains a rotational speed command of the generator 13 based on the obtained engine acceleration/deceleration term and motor speed term (step S208). Then, the controller 100 obtains the rotational speed of the generator 13, and performs rotational speed control (step S209) and torque control (step S210) of the generator 13 based on the obtained actual rotational speed of the generator 13 and the rotational speed command of the generator 13. Then, the controller 100 terminates the current processing, and executes the processing in step S201 after a lapse of a predetermined period of time.

If it is determined in the processing in step S204 that the target moving distance of the engine 11 is equal to or smaller than the predetermined distance, in other words, if the current position of the crankshaft is close to the target stop position (step S204: Yes), the controller 100 calculates the moving distance of the crankshaft of the engine 11 (step S211).

Then, the controller 100 selects the position correction map, and obtains a position correction term (refer to "position correction term" in FIG. 5) based on the selected position correction map, the moving distance and the target moving distance of the engine, and the gear ratio of the power split mechanism (step S212). In parallel with the processing in step S212, the controller 100 obtains a motor speed term based on the rotational speed of the motor 12 and the gear ratio of the power split mechanism (step S213).

Then, the controller 100 obtains a rotational speed command of the generator 13 based on the obtained position correction term and motor speed term (step S214). Then, the controller 100 obtains the rotational speed of the generator 13, and performs rotational speed control (step S215) and torque control (step S216) of the generator 13 based on the obtained actual rotational speed of the generator 13 and the rotational speed command of the generator 13.

Then, the controller 100 determines whether a predetermined period of time has elapsed (step S217). Here, the starting time of the predetermined period of time is when the processing in step S217 is executed for the first time after the setting of the engine stop position correction flag, for example.

If it is determined that the predetermined period of time has not elapsed (step S217: No), the controller 100 counts up a timer, for example, before executing the processing in step S211. The controller 100 may determine whether the predetermined period of time has elapsed based on the value of the timer.

On the other hand, if it is determined that the predetermined period of time has elapsed (step S217: Yes), the controller 100 clears the engine stop position correction command and clears the engine stop position correction flag based on the premise that the crankshaft of the engine 11 has stopped at a target stop position (step S218).

In this embodiment in particular, the engine acceleration/deceleration map, which has a relatively low resolution and a relatively high upper limit for the engine speed command, is selected until the target moving distance of the engine 11 decreases to a predetermined distance or smaller (in other words, until the position of the crankshaft comes close to the target stop position), and the position correction map, which has a relatively high resolution and a relatively low upper limit for the engine speed command, is selected after the target moving distance of the engine 11 decreases to the predetermined distance or smaller. As a result, the crankshaft can be stopped at a target stop position relatively quickly with high accuracy in this engine stop position correction processing as in the above engine stop processing.

Engine control processing that the controller 100 executes primarily while the vehicle is travelling is next described with reference to a flowchart in FIG. 7.

Figure 7:
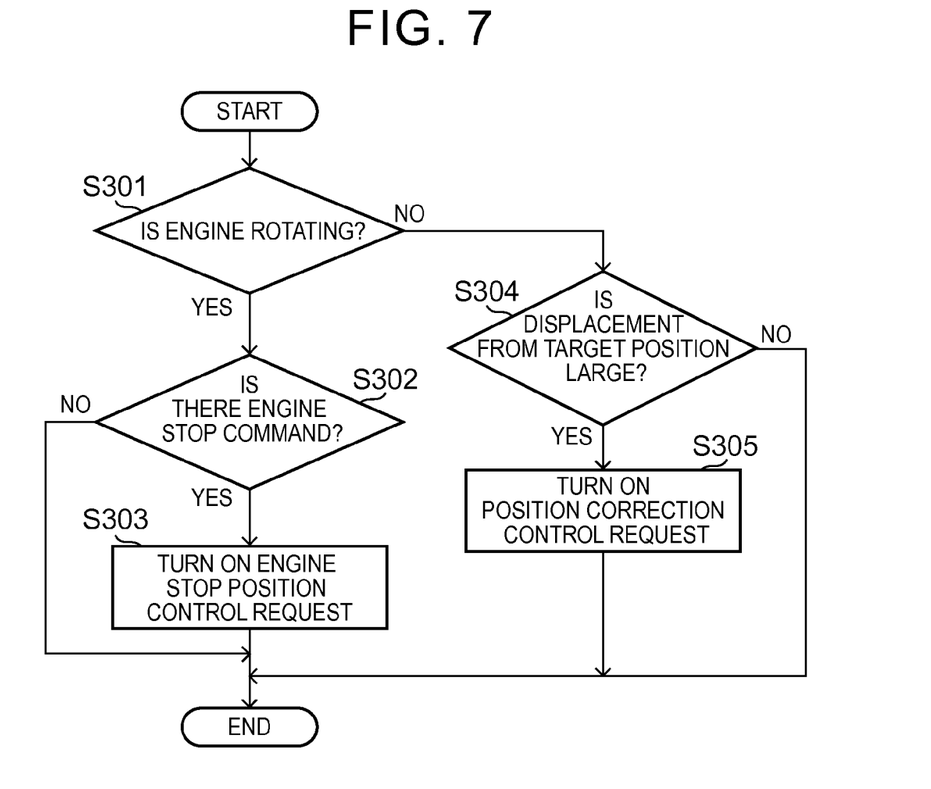
FIG. 7 is a flowchart that illustrates engine control processing according to the embodiment.

As shown in FIG. 7, the controller 100 first determines whether the engine 11 is rotating (in other words, in operation) (step S301). If it is determined that the engine 11 is rotating (step S301: Yes), the controller 100 determines whether there is an engine stop command (in other words, whether the conditions for an automatic stop of the engine 11 are fulfilled) (step S302).

If it is determined that there is no engine stop command (step S302: No), the controller 100 terminates the current processing and executes the processing in step S301 again after a lapse of a predetermined period of time (in other words, puts itself into a standby state).

On the other hand, if it is determined that there is an engine stop command (step 302: Yes), the controller 100 turns on an engine stop position control request (for example, sets the engine automatic stop flag) (step S303). After step S303, the controller 100 executes the above engine stop control processing (refer to FIG. 4).

If it is determined that the engine 11 is not in operation in the processing in step S301 (step S301: No), the controller 100 determines whether the current position of the crankshaft is displaced from the target stop position beyond an allowable range (step S304).

If it is determined that the current position of the crankshaft is not displaced from the target stop position beyond the allowable range (step S304: No), the controller 100 terminates the current processing, and executes the processing in step S301 again after a lapse of a predetermined period of time.

On the other hand, if it is determined that the current position of the crankshaft is displaced from the target stop position beyond the allowable range (step S304: Yes), the controller 100 turns on a position correction control request (for example, sets the engine stop position correction flag) (step S305). After the processing in step S305, the controller 100 executes the above engine stop position correction processing (refer to FIG. 5).

The "generator 13" according to the embodiment is one example of the "motor" according to the invention. The "controller 100" according to the embodiment is one example of the "detection part" and the "control part" according to the invention.

The invention is not limited to the above embodiment. The invention can be modified as needed to the extent that does not conflict with the gist or spirit of the invention that can be read from the claims and the entire specification, and an engine stop device that involves such a modification is also included in the technical scope of the invention.

What is claimed is:

1. An engine stop device that is mounted on a vehicle that is equipped with an engine and a motor that is able to output torque to a crankshaft of the engine, the engine stop device comprising:
    a detection part that detects a difference between a current position of the crankshaft and a target stop position of the crankshaft; and
    a control part that controls the motor based on the detected difference so that the crankshaft is able to approach the target stop position when the engine is stopped or after the engine is stopped, wherein
    the control part selects one of a plurality of maps that define a relationship between a moving distance which is a value that relates to a rotational angle of the crankshaft and a rotational speed of the crankshaft based on the detected difference, and controls the motor based on the selected map.

2. The engine stop device according to claim 1, wherein the control part selects, from the plurality of maps, a correction map when the detected difference is smaller than a threshold value, the correction map being a map in which the relationship between the moving distance and the rotational speed is defined with a higher resolution than in a first map that is selected when the detected difference is equal to or greater than the threshold value.

3. The engine stop device according to claim 2, wherein the rotational speed is regarded as zero in the correction map when the moving distance has a value within a predetermined range that includes the target stop position.

4. The engine stop device according to claim 2, wherein the correction map has an upper limit for the rotational speed that is lower than that in the first map.

5. The engine stop device according to claim 2, wherein when a stop position of the crankshaft is displaced from the target stop position after the engine is stopped, the control part selects, as the first map, a map in which the rotational speed once increases in such a direction as to rotate the crankshaft positively and then decreases as the current position of the crankshaft approaches the target stop position, and selects, as the correction map, a map in which the rotational speed in such a direction as to rotate the crankshaft positively decreases as the current position of the crankshaft approaches the target stop position from such a direction that the moving distance increases and the rotational speed in such a direction as to rotate the crankshaft negatively decreases as the current position of the crankshaft approaches the target stop position from such a direction that the moving distance decreases.

* * * * *